United States Patent
Rae et al.

(10) Patent No.: US 7,916,845 B2
(45) Date of Patent: *Mar. 29, 2011

(54) UNAUTHORIZED CALL ACTIVITY DETECTION AND PREVENTION SYSTEMS AND METHODS FOR A VOICE OVER INTERNET PROTOCOL ENVIRONMENT

(75) Inventors: Robert L. Rae, Plano, TX (US); Michelle L. Polozola, Richardson, TX (US); John S. Hogg, Jr., Bedford, TX (US)

(73) Assignee: Securus Technologies, Inc., Dallas, TX (US)

(*) Notice: Subject to any disclaimer, the term of this patent is extended or adjusted under 35 U.S.C. 154(b) by 1365 days.

This patent is subject to a terminal disclaimer.

(21) Appl. No.: 11/403,547

(22) Filed: Apr. 13, 2006

(65) Prior Publication Data

US 2007/0242658 A1    Oct. 18, 2007

(51) Int. Cl.
*H04M 3/42* (2006.01)

(52) U.S. Cl. .................. 379/201.01; 379/188

(58) Field of Classification Search .......... 379/201.02, 379/188; 455/411
See application file for complete search history.

(56) References Cited

U.S. PATENT DOCUMENTS

| | | |
|---|---|---|
| 3,096,404 A | 7/1963 | Semon |
| 3,113,185 A | 12/1963 | Semon |
| 3,350,515 A | 10/1967 | Semon |
| 3,397,288 A | 8/1968 | Semon |
| 3,398,288 A | 8/1968 | Sanders et al. |
| 3,626,107 A | 12/1971 | Armstrong et al. |
| 3,660,610 A | 5/1972 | Hestad et al. |
| 3,676,605 A | 7/1972 | Johnson |
| 3,798,382 A | 3/1974 | Hoven |
| 3,813,495 A | 5/1974 | Conerly |
| 3,829,617 A | 8/1974 | Caithamer et al. |
| 3,851,121 A | 11/1974 | Marvin |
| 3,864,519 A | 2/1975 | Owen |
| 3,952,160 A | 4/1976 | Pasternack et al. |
| 3,985,956 A | 10/1976 | Monti et al. |
| 3,997,731 A | 12/1976 | Wilmot et al. |
| 4,001,513 A | 1/1977 | Naylor |
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |

(Continued)

FOREIGN PATENT DOCUMENTS

EP    0185365 A1    6/1986

(Continued)

OTHER PUBLICATIONS

U.S. Appl. No. 09/905,014, filed Jul. 13, 2001.

(Continued)

*Primary Examiner* — William J Deane
(74) *Attorney, Agent, or Firm* — Fenwick & West LLP (57) ABSTRACT

Embodiments connect a call in which at least one party is a VoIP call party and monitoring resulting VoIP signals for unauthorized call activity, such as three-way call activity. The monitoring may include monitoring the call for suspend and/or resume events to detect the unauthorized call activity, the suspend and resume events may be generated by a telephone system and passed into a VoIP system associated with the VoIP call party. The monitoring may be carried out by an agent disposed between a VoIP gateway and the VoIP call party or by the VoIP gateway itself.

41 Claims, 3 Drawing Sheets

U.S. PATENT DOCUMENTS

| | | | |
|---|---|---|---|
| 4,156,799 A | 5/1979 | Cave | |
| 4,188,508 A | 2/1980 | Rogers et al. | |
| 4,196,317 A | 4/1980 | Bartelink | |
| 4,310,726 A | 1/1982 | Asmuth | |
| 4,319,091 A | 3/1982 | Meri | |
| 4,326,123 A | 4/1982 | Hosterman | |
| 4,333,056 A | 6/1982 | Cave | |
| 4,371,752 A | 2/1983 | Matthews et al. | |
| 4,387,274 A | 6/1983 | Stein et al. | |
| 4,405,833 A | 9/1983 | Cave et al. | |
| 4,439,636 A | 3/1984 | Newkirk et al. | |
| 4,445,211 A | 4/1984 | Webber | |
| 4,477,698 A | 10/1984 | Szlam et al. | |
| 4,518,825 A | 5/1985 | Brinkerhoff et al. | |
| 4,538,030 A | 8/1985 | Fossett et al. | |
| 4,540,855 A | 9/1985 | Szlam et al. | |
| 4,552,996 A | 11/1985 | de Bergh | |
| 4,559,416 A | 12/1985 | Theis et al. | |
| 4,585,904 A | 4/1986 | Mincone et al. | |
| 4,593,157 A | 6/1986 | Usdan | |
| 4,595,983 A | 6/1986 | Gehalo et al. | |
| 4,602,129 A | 7/1986 | Matthews et al. | |
| 4,626,630 A | 12/1986 | Waldman | |
| 4,629,829 A | 12/1986 | Puhl et al. | |
| 4,644,109 A | 2/1987 | Takeda et al. | |
| 4,686,699 A | 8/1987 | Wilkie | |
| 4,696,028 A | 9/1987 | Morganstein et al. | |
| 4,696,031 A | 9/1987 | Freudberg et al. | |
| 4,698,840 A | 10/1987 | Dively et al. | |
| 4,712,230 A | 12/1987 | Rice et al. | |
| 4,723,273 A | 2/1988 | Diesel et al. | |
| 4,726,057 A | 2/1988 | Doerry et al. | |
| 4,727,577 A | 2/1988 | Frey et al. | |
| 4,731,818 A | 3/1988 | Clark, Jr. et al. | |
| 4,736,405 A | 4/1988 | Akiyama | |
| 4,737,982 A | 4/1988 | Boratgis et al. | |
| 4,746,786 A | 5/1988 | Heberle et al. | |
| 4,763,350 A | 8/1988 | Immendorfer et al. | |
| 4,766,604 A | 8/1988 | Axberg | |
| 4,768,223 A | 8/1988 | Kinoshita et al. | |
| 4,768,227 A | 8/1988 | Dively et al. | |
| 4,769,834 A | 9/1988 | Billinger et al. | |
| 4,777,647 A | 10/1988 | Smith et al. | |
| 4,782,516 A | 11/1988 | Maybach et al. | |
| 4,791,640 A | 12/1988 | Sand | |
| 4,794,642 A | 12/1988 | Arbabzadah et al. | |
| 4,797,910 A | 1/1989 | Daudelin | |
| 4,799,255 A | 1/1989 | Billinger et al. | |
| 4,802,207 A | 1/1989 | Uchida | |
| 4,803,718 A | 2/1989 | Neil et al. | |
| 4,815,120 A | 3/1989 | Kosich | |
| 4,825,460 A | 4/1989 | Carter et al. | |
| 4,839,917 A | 6/1989 | Oliver | |
| 4,850,011 A | 7/1989 | Delmege et al. | |
| 4,868,873 A | 9/1989 | Kamil | |
| 4,885,765 A | 12/1989 | Shirakawa | |
| 4,890,317 A | 12/1989 | Hird et al. | |
| 4,896,348 A | 1/1990 | Grantland et al. | |
| 4,899,358 A | 2/1990 | Blakley | |
| 4,899,375 A | 2/1990 | Bauer et al. | |
| 4,901,341 A | 2/1990 | Carter et al. | |
| 4,908,852 A | 3/1990 | Hird et al. | |
| 4,916,733 A | 4/1990 | Smith et al. | |
| 4,920,562 A | 4/1990 | Hird et al. | |
| 4,922,519 A | 5/1990 | Daudelin | |
| 4,922,520 A | 5/1990 | Bernard et al. | |
| 4,924,488 A | 5/1990 | Kosich | |
| 4,924,501 A | 5/1990 | Cheeseman et al. | |
| 4,932,062 A | 6/1990 | Hamilton | |
| 4,933,966 A | 6/1990 | Hird et al. | |
| 4,933,967 A | 6/1990 | Lo et al. | |
| 4,935,956 A | 6/1990 | Hellwarth et al. | |
| 4,937,856 A | 6/1990 | Natarajan | |
| 4,937,862 A | 6/1990 | Kosich | |
| 4,943,995 A | 7/1990 | Daudelin et al. | |
| 4,944,001 A | 7/1990 | Kizuik et al. | |
| 4,947,422 A | 8/1990 | Smith et al. | |
| 4,947,425 A | 8/1990 | Grizmala et al. | |
| 4,979,214 A | 12/1990 | Hamilton | |
| 4,991,203 A | 2/1991 | Kakizawa | |
| 4,993,062 A | 2/1991 | Dula et al. | |
| 4,993,068 A | 2/1991 | Piosenka et al. | |
| 5,003,595 A | 3/1991 | Collins et al. | |
| 5,008,923 A | 4/1991 | Kitamura et al. | |
| 5,020,095 A | 5/1991 | Morganstein et al. | |
| 5,022,067 A | 6/1991 | Hughes | |
| 5,023,869 A | 6/1991 | Grover et al. | |
| 5,023,906 A | 6/1991 | Novas | |
| 5,033,088 A | 7/1991 | Shipman | |
| 5,054,059 A | 10/1991 | Stern et al. | |
| 5,063,593 A | 11/1991 | Kwon | |
| 5,093,858 A | 3/1992 | Hird et al. | |
| 5,109,405 A | 4/1992 | Morganstein | |
| 5,131,024 A | 7/1992 | Pugh et al. | |
| 5,134,651 A | 7/1992 | Ortiz et al. | |
| 5,150,357 A | 9/1992 | Hopner et al. | |
| 5,153,907 A | 10/1992 | Pugh et al. | |
| 5,155,761 A | 10/1992 | Hammond | |
| 5,163,083 A | 11/1992 | Dowden et al. | |
| 5,164,989 A | 11/1992 | Brandman et al. | |
| 5,181,237 A | 1/1993 | Dowden et al. | |
| 5,187,740 A | 2/1993 | Swaim et al. | |
| 5,193,110 A | 3/1993 | Jones et al. | |
| 5,200,995 A | 4/1993 | Gaukel et al. | |
| 5,210,789 A | 5/1993 | Jeffus et al. | |
| 5,216,702 A | 6/1993 | Ramsden | |
| 5,218,636 A | 6/1993 | Hamilton | |
| 5,220,501 A | 6/1993 | Lawlor et al. | |
| 5,222,120 A | 6/1993 | McLeod et al. | |
| 5,229,764 A | 7/1993 | Matchett et al. | |
| 5,247,569 A | 9/1993 | Cave | |
| 5,255,305 A | 10/1993 | Sattar | |
| 5,274,698 A | 12/1993 | Jang | |
| 5,276,731 A | 1/1994 | Arbel et al. | |
| 5,283,825 A | 2/1994 | Druckman et al. | |
| 5,283,829 A | 2/1994 | Anderson | |
| 5,287,401 A | 2/1994 | Lin | |
| 5,305,312 A | 4/1994 | Fornek et al. | |
| 5,309,505 A | 5/1994 | Szlam et al. | |
| 5,311,589 A | 5/1994 | Bennett et al. | |
| 5,319,701 A | 6/1994 | Hird et al. | |
| 5,319,702 A | 6/1994 | Kitchin et al. | |
| 5,321,754 A | 6/1994 | Fisher et al. | |
| 5,323,448 A | 6/1994 | Biggs et al. | |
| 5,325,421 A | 6/1994 | Hou et al. | |
| 5,325,427 A | 6/1994 | Dighe | |
| 5,327,489 A | 7/1994 | Anderson et al. | |
| 5,329,578 A | 7/1994 | Brennan et al. | |
| 5,333,181 A | 7/1994 | Biggs | |
| 5,335,266 A | 8/1994 | Richardson, Jr. et al. | |
| 5,345,501 A | 9/1994 | Shelton | |
| 5,345,595 A | 9/1994 | Johnson et al. | |
| 5,351,285 A | 9/1994 | Katz | |
| 5,351,287 A | 9/1994 | Bhattacharyya et al. | |
| 5,355,403 A | 10/1994 | Richardson, Jr. et al. | |
| 5,369,699 A | 11/1994 | Page et al. | |
| 5,375,161 A | 12/1994 | Fuller et al. | |
| 5,381,474 A | 1/1995 | Lahdemaki et al. | |
| 5,394,465 A | 2/1995 | Jo | |
| 5,416,831 A | 5/1995 | Chewning, III et al. | |
| 5,425,087 A | 6/1995 | Gerber et al. | |
| 5,428,662 A | 6/1995 | Hamilton | |
| 5,442,696 A | 8/1995 | Lindberg et al. | |
| 5,450,485 A | 9/1995 | Hamilton | |
| 5,452,347 A | 9/1995 | Iglehart et al. | |
| 5,455,819 A | 10/1995 | Sugiyama | |
| 5,461,665 A | 10/1995 | Shur et al. | |
| 5,465,293 A | 11/1995 | Chiller et al. | |
| 5,465,387 A | 11/1995 | Mukherjee | |
| 5,471,519 A | 11/1995 | Howe et al. | |
| 5,473,686 A | 12/1995 | Virdee | |
| 5,483,582 A | 1/1996 | Pugh et al. | |
| 5,483,593 A | 1/1996 | Gupta et al. | |
| 5,485,507 A | 1/1996 | Brown et al. | |
| 5,497,414 A | 3/1996 | Bartholomew | |
| 5,504,810 A | 4/1996 | McNair | |
| 5,524,141 A | 6/1996 | Braun et al. | |

| | | |
|---|---|---|
| 5,524,145 A | 6/1996 | Parker |
| 5,535,261 A | 7/1996 | Brown et al. |
| 5,539,812 A | 7/1996 | Kitchin et al. |
| 5,544,231 A | 8/1996 | Cho |
| 5,566,229 A | 10/1996 | Hou et al. |
| 5,577,116 A | 11/1996 | Townsend et al. |
| 5,583,920 A | 12/1996 | Wheeler, Jr. |
| 5,583,934 A | 12/1996 | Zhou |
| 5,606,604 A | 2/1997 | Rosenblatt et al. |
| 5,617,471 A | 4/1997 | Rogers et al. |
| 5,619,561 A | 4/1997 | Reese |
| 5,627,887 A | 5/1997 | Freedman |
| 5,634,126 A | 5/1997 | Norell |
| 5,651,056 A | 7/1997 | Eting et al. |
| 5,655,013 A | 8/1997 | Gainsboro |
| 5,682,386 A | 10/1997 | Arimilli et al. |
| 5,722,418 A | 3/1998 | Bro |
| 5,724,404 A | 3/1998 | Garcia et al. |
| 5,742,905 A | 4/1998 | Pepe et al. |
| 5,745,553 A | 4/1998 | Mirville et al. |
| 5,745,558 A | 4/1998 | Richardson, Jr. et al. |
| 5,757,781 A | 5/1998 | Gilman et al. |
| 5,768,355 A | 6/1998 | Salibrici et al. |
| 5,777,558 A | 7/1998 | Pennypacker et al. |
| 5,796,811 A | 8/1998 | McFarlen |
| 5,799,068 A | 8/1998 | Kikinis et al. |
| 5,805,685 A | 9/1998 | McFarlen |
| 5,809,125 A | 9/1998 | Gammino |
| 5,844,978 A | 12/1998 | Reuss et al. |
| 5,859,907 A | 1/1999 | Kawahara et al. |
| 5,862,519 A | 1/1999 | Sharma et al. |
| 5,867,559 A | 2/1999 | Jorgensen et al. |
| 5,875,230 A | 2/1999 | Ganley et al. |
| 5,883,945 A | 3/1999 | Richardson, Jr. et al. |
| 5,907,602 A | 5/1999 | Peel et al. |
| 5,923,746 A | 7/1999 | Baker et al. |
| 5,926,533 A | 7/1999 | Gainsboro |
| 5,937,042 A | 8/1999 | Sofman |
| 5,943,403 A | 8/1999 | Richardson, Jr. et al. |
| 5,946,386 A | 8/1999 | Rogers et al. |
| 5,960,064 A | 9/1999 | Foladare et al. |
| 6,031,895 A | 2/2000 | Cohn et al. |
| 6,052,454 A | 4/2000 | Kek et al. |
| 6,064,963 A | 5/2000 | Gainsboro |
| 6,072,860 A | 6/2000 | Kek et al. |
| 6,075,843 A | 6/2000 | Cave |
| 6,097,804 A | 8/2000 | Gilbert et al. |
| 6,134,320 A | 10/2000 | Swan et al. |
| 6,141,406 A | 10/2000 | Johnson |
| 6,169,789 B1 | 1/2001 | Rao et al. |
| RE37,073 E | 2/2001 | Hammond |
| 6,188,751 B1 | 2/2001 | Scherer |
| 6,249,570 B1 | 6/2001 | Glowny et al. |
| 6,320,946 B1 | 11/2001 | Enzmann et al. |
| 6,320,948 B1 | 11/2001 | Heilmann et al. |
| 6,324,280 B2 | 11/2001 | Dunn et al. |
| 6,363,065 B1 | 3/2002 | Thornton et al. |
| 6,366,653 B1 | 4/2002 | Yeh et al. |
| 6,381,321 B1 | 4/2002 | Brown et al. |
| 6,404,764 B1 | 6/2002 | Jones et al. |
| 6,404,857 B1 | 6/2002 | Blair et al. |
| 6,404,870 B1 | 6/2002 | Kia |
| 6,445,682 B1 | 9/2002 | Weitz |
| 6,480,590 B1 | 11/2002 | Ku |
| 6,487,200 B1 | 11/2002 | Fraser |
| 6,496,477 B1 | 12/2002 | Perkins et al. |
| 6,529,500 B1 | 3/2003 | Pandharipande |
| 6,529,602 B1 | 3/2003 | Walker et al. |
| 6,553,336 B1 | 4/2003 | Johnson et al. |
| 6,560,323 B2 | 5/2003 | Gainsboro |
| 6,560,325 B2 | 5/2003 | Brown et al. |
| 6,611,583 B1 | 8/2003 | Gainsboro |
| 6,621,812 B1 | 9/2003 | Chapman et al. |
| 6,654,722 B1 | 11/2003 | Aldous et al. |
| 6,665,380 B1 | 12/2003 | Cree et al. |
| 6,687,360 B2 | 2/2004 | Kung et al. |
| 6,731,630 B1 | 5/2004 | Schuster et al. |
| 6,788,775 B1 | 9/2004 | Simpson |
| 6,795,444 B1 | 9/2004 | Vo et al. |
| 6,816,469 B1 | 11/2004 | Kung et al. |
| 6,876,647 B2 | 4/2005 | Celi, Jr. |
| 6,904,139 B2 | 6/2005 | Brown et al. |
| 6,920,209 B1 | 7/2005 | Gainsboro |
| 6,985,478 B2 | 1/2006 | Pogossiants et al. |
| 7,039,171 B2 | 5/2006 | Gickler |
| 7,042,992 B1 | 5/2006 | Falcone et al. |
| 7,046,782 B2 | 5/2006 | Miller |
| 7,075,922 B2 | 7/2006 | Mussman et al. |
| 7,085,359 B2 | 8/2006 | Crites et al. |
| 7,203,186 B1 | 4/2007 | Fuller et al. |
| 7,302,053 B2 | 11/2007 | Chang et al. |
| 7,333,798 B2 | 2/2008 | Hodge |
| 7,360,087 B2 | 4/2008 | Jorgensen et al. |
| 7,360,090 B1 | 4/2008 | Doskow et al. |
| 7,505,406 B1 | 3/2009 | Spadaro et al. |
| 2001/0028649 A1 | 10/2001 | Pogossiants et al. |
| 2001/0036821 A1 | 11/2001 | Gainsboro et al. |
| 2001/0041590 A1 | 11/2001 | Silberfenig et al. |
| 2001/0047333 A1 | 11/2001 | Kim et al. |
| 2002/0071537 A1 | 6/2002 | Gainsboro |
| 2002/0141386 A1 | 10/2002 | Minert et al. |
| 2002/0159440 A1 | 10/2002 | Mussman et al. |
| 2002/0176403 A1 | 11/2002 | Radian |
| 2003/0002639 A1 | 1/2003 | Huie |
| 2003/0023714 A1 | 1/2003 | Zeigler et al. |
| 2003/0091028 A1 | 5/2003 | Chang et al. |
| 2003/0126470 A1 | 7/2003 | Crites et al. |
| 2003/0133558 A1 | 7/2003 | Kung et al. |
| 2003/0185204 A1 | 10/2003 | Murdock |
| 2004/0052218 A1 | 3/2004 | Knappe |
| 2006/0209797 A1 | 9/2006 | Anisimov et al. |
| 2006/0285650 A1 | 12/2006 | Hodge |
| 2006/0286962 A1 | 12/2006 | Davis |
| 2007/0041545 A1 | 2/2007 | Gainsboro |
| 2007/0071206 A1 | 3/2007 | Gainsboro et al. |
| 2007/0115924 A1 | 5/2007 | Schneider et al. |
| 2007/0242658 A1 | 10/2007 | Rae et al. |
| 2007/0263812 A1 | 11/2007 | Polozola et al. |
| 2008/0040780 A1 | 2/2008 | Reinhold |

FOREIGN PATENT DOCUMENTS

| | | |
|---|---|---|
| EP | 0814583 A2 | 12/1997 |
| EP | 1175074 | 1/2002 |
| FR | 2600850 | 12/1987 |
| GB | 2134749 A | 8/1984 |
| JP | 5-30193 | 2/1993 |
| JP | 63-03305 | 10/1994 |
| JP | 63-033054 | 12/1994 |
| JP | 2002/157327 A | 5/2002 |
| JP | 2003110758 | 4/2003 |
| WO | WO 96/20448 A1 | 7/1996 |
| WO | WO 97/22208 A2 | 6/1997 |
| WO | WO 98/13993 A1 | 4/1998 |
| WO | WO 00/54491 A1 | 9/2000 |

OTHER PUBLICATIONS

U.S. Appl. No. 10/252,956, filed Sep. 20, 2002.
U.S. Appl. No. 10/642,532, filed Aug. 15, 2003.
U.S. Appl. No. 10/646,638, filed Aug. 22, 2003.
U.S. Appl. No. 10/800,473, filed Mar. 15, 2004.
Scidyn Commander 3-WayCall Detection System [online] [Retrieved on Jun. 20, 2006] Retrieved from: http://www.scidyn.com/products/Commander%203-way%20Detection.pdf 5 pages.
Anonymous, "VoIP The Evolving Solution and the Evolving Threat," Internet Security Systems, Inc., XP-002444626, 2004, pp. 1-7.
Thermos, Peter, "Two attacks against VoIP," Security Focus, XP-002444627, Apr. 4, 2006, pp. 1-8.
United States Office Action, U.S. Appl. No. 09/905,014, Apr. 19, 2005, 19 pages.
United States Office Action, U.S. Appl. No. 09/905,014, Jan. 9, 2006, 22 pages.
United States Office Action, U.S. Appl. No. 09/905,014, Sep. 14, 2006, 23 pages.
United States Office Action, U.S. Appl. No. 09/905,014, Mar. 22, 2007, 25 pages.

United States Office Action, U.S. Appl. No. 09/905,014, Sep. 12, 2007, 29 pages.
United States Office Action, U.S. Appl. No. 09/905,014, Mar. 17, 2008, 27 pages.
United States Office Action, U.S. Appl. No. 10/642,532, Mar. 20, 2008, 26 pages.
United States Office Action, U.S. Appl. No. 10/642,532, Nov. 7, 2008, 16 pages.
United States Office Action, U.S. Appl. No. 10/642,532, Feb. 23, 2009, 15 pages.
United States Office Action, U.S. Appl. No. 10/642,532, Sep. 9, 2009, 18 pages.
United States Office Action, U.S. Appl. No. 10/800,473, Nov. 28, 2007, 20 pages.
United States Office Action, U.S. Appl. No. 10/800,473, Sep. 5, 2008, 22 pages.
United States Office Action, U.S. Appl. No. 10/800,473, Apr. 16, 2009, 32 pages.
United States Office Action, U.S. Appl. No. 11/777,168, Apr. 8, 2008, 12 pages.
United States Office Action, U.S. Appl. No. 11/777,168, Oct. 29, 2008, 5 pages.
United States Office Action, U.S. Appl. No. 11/777,168, Nov. 20, 2008, 5 pages.
Anderson, Susan, "Three-Way Call Detect . . . Close Enough to Perfect?" Correctional Communications Quarterly, pp. 16-20, Oct. 1993.
Bahl, L. "A Maximum Likelihood Approach to Continuous Speech Recovery," Readings in Speech Recognition, Ed. A. Waibel and K. Lee, Morgan Kaufmann Publishers, pp. 308-319, IEEE 1983.
Batten, A. "Personal Communications Service and the Intelligent Network," British Telecommunications Engineering, vol. 9, pp. 88-91, Aug. 1990.
"BubbleLINK® Software Architecture," SciDyn™, The Voice of IP Technology™, [online] [Retrieved on Nov. 4, 2005], Retrieved from: http://www.scidyn.com/products/BubbleLink%20White.pdf.
"Call Control—Commander II," SciDyn™ Products, [online] [Retrieved on Nov. 4, 2005], Retrieved from : http://www.scidyn.com/products/commander2.html.
DPD/120-JP Product on Display at Communications Tokyo '01, Apr. 2-5, 1991 (Product described in U.S. Patent No. 5,218,636).
European Examination Report, EP07251570.3, May 29, 2008, 5 pages.
Exhibits A-N, Various materials compiled by Applicants.
HR Solutions, http://www.solutions.hrd.com/methods_of_electronic_monitoring.htm, p. 4 of 5, Telephone Surveillance.
Jones International, http://www.jonesencyclo.com/encyclo/update/ecpa.html, 1-7, Electronic Communications Privacy Act.
LazerVoice, Digital Recording System Inmate Services, 1997-1998, Schlumberger Technologies, Inc. / LazerVoice STIL V0222
LazerVoice User's Manual—Version 2.22, pp. 1-41, published Apr. 28, 1998 by Schlumberger Technologies, Inc./LazerVoice of Mobile, Alabama.
"LazerPhone User Reference Manual," 150 pages, edition and publisher unknown.
"LazerPhone Inmate Telephone System, Users Manual version 1.0," pp. 1-29, published Oct. 1998 by Schlumberger Technologies, Inc./Global Tel*Link of Mobile, Alabama.
LazerPhone, Powerful Performance Uncompromising Standards, 1998.
LazerPhone Technical Manual, "Chapter I. System Overview," pp. 1.1-1.6, published by Schlumberger Technologies, Inc. of Mobile, Alabama.
Lee, K., "Large-Vocabulary Speaker-Independent Continuous Speech Recognition Using HMM," Carnegie Mellon University Department of Electrical and Computer Engineering, CMU-CS-88-148, Apr. 1988.
Manual for "DPD/120-JP Dial Pulse Detection Board," Dialogic Systems Ltd., Tokyo, Japan, (Product described in U.S. Patent No. 5,218,636), undated.
Ossgr, vol. 3, "Feature Specific Documents," Technical Ref. TSY-000271 FSD 85-01-0100 Calling Card Service—Published by Bell Communications Research-Revision #3, Dated Mar. 1988.
Ossgr, vol. 3, "Feature Specific Documents," Technical Ref. TSY-000271 FSD-85-01-0200 Collect Billing—Published by Bell Communications Research—Revision #3 Dated Mar. 1988.
PCT International Search Report, PCT/US99/09493, Aug. 20, 1999, 5 pages.
PCT Written Opinion, PCT/US99/09493, Feb. 9, 2000, 12 pages.
"PPCS (Prison Prepaid Card System)", DiaVox Technologies, Inc., Nov. 2000, 10 pages.
"ShoreTel: Intelligent Phone Systems, Products," Internet Brief, 4 pgs. Retrieved on Nov. 4, 2005, Retrieved from : http://www.shoretel.com/STCorp:/products/architecture/aspx.
"SciDynVoIP Technology Now Available for Call Control Solutions," SciDyn™ Press Release, [online] [Retrieved on Nov. 4, 2005], Retrieved from : http://www.scidyn.com/news/pr/0122pr.html.
"Smart Features for Optimizing Your Network," SciDyn™ BubbleLINK®, [online] [Retrieved on Nov. 4, 2005], Retrieved from: http://www.scidyn.com/products/bubble.html.
"System 20" Value Added Communications (VAC), Nov. 1992, Brochure (4 pages).
Telematic "ConQuest III Inmate Telephone System," Nov. 1992.
U.S. Appl. No. 09/229,385, Cree et al., filed Jan. 1999 (Reference not included).
U.S. Appl. No. 09/640,831, Swope et al., Entitled "System and Method for Reverse Billing for Telephone Call," Filed Aug. 17, 2000 (Reference not included).
U.S. Appl. No. 09/955,253, Lord, Entitled "Method and Apparatus for Exchange Data Between a Primary Computer System to Ensure Transactional Reconciliation Between the Systems," Filed Nov. 27, 2001 (Reference not included).
U.S. Appl. No. 10/022,946, Draizin et al., Entitled "A Method for Determining an Entity Responsible for Billing a Called Party," Filed Dec. 17, 2001 (Reference not included).
U.S. Appl. No. 10/135,878, Viola et al., Entitled "Information Management and Movement System and Method," Filed Apr. 29, 2002 (Reference not included).
U.S. Appl. No. 10/190,315, Falcone et al., Entitled "Systems and Methods for Offering a Service to a Party Associated with a Blocked Call," Filed Jul. 3, 2002 (Reference not included).
U.S. Appl. No. 10/135,883, Falcone et al., Entitled "Optimizing Profitability in Business Transactions," Filed Nov. 25, 2003 (Reference not included).
U.S. Appl. No. 10/437,839, Hite et al., Entitled "Intelligent Queuing of Transaction Records," Filed May 14, 2003 (Reference not included).
U.S. Appl. No. 10/360,248, Falcone et al., Entitled "Systems and Methods for Account Establishment and Transaction Management Using Interrupt Messaging," Filed Feb. 7, 2003 (Reference not included).
U.S. Appl. No. 10/360,442, Falcone et al., Entitled "Systems and Methods for Transactions Authorization Determination," Filed Feb. 7, 2003 (Reference not included).
U.S. Appl. No. 10/420,585, McNitt et al., Entitled "System and Method for Detecting Unauthorized Call Activity," (Reference not included).
U.S. Appl. No. 11/777,168, Rae et al., Entitled "Inmate Management and Call Processing Systems and Methods," filed Feb. 12, 2007 (Reference not included).
United States Office Action, U.S. Appl. No. 10/800,473, Mar. 24, 2010, 32 pages.
United States Office Action, U.S. Appl. No. 10/642,532, Jan. 6, 2010, 17 pages.
United States Office Action, U.S. Appl. No. 10/642,532, Jul. 21, 2010, 19 pages.
United States Office Action, U.S. Appl. No. 10/800,473, Aug. 30, 2010, 33 pages.

FIG. 1

UNAUTHORIZED CALL ACTIVITY DETECTION AND PREVENTION SYSTEMS AND METHODS FOR A VOICE OVER INTERNET PROTOCOL ENVIRONMENT

CROSS-REFERENCE TO RELATED APPLICATIONS

The present application is related to co-pending, and commonly assigned U.S. patent application Ser. No. 10/646,638 filed Aug. 22, 2003, entitled "SYSTEM AND METHOD FOR CALL REDIRECT DETECTION AND TREATMENT"; U.S. patent application Ser. No. 10/252,956, filed Sep. 20, 2002, entitled "THREE-WAY TELEPHONE CALL PREVENTION SYSTEM AND METHOD"; U.S. patent application Ser. No. 10/642,532 filed Aug. 15, 2003, entitled "CENTRALIZED CALL PROCESSING"; U.S. patent application Ser. No. 10/800,473 filed Mar. 15, 2004, entitled "CALL PROCESSING WITH VOICE OVER INTERNET PROTOCOL TRANSMISSION"; and U.S. patent application Ser. No. 09/905,014 filed Jul. 13, 2001, entitled "PUBLIC TELEPHONE CONTROL WITH VOICE OVER INTERNET PROTOCOL TRANSMISSION"; the disclosures of which are hereby incorporated herein by reference.

TECHNICAL FIELD

The present invention relates to the field of telecommunications and in particular to systems and methods for detecting and/or preventing the unauthorized use of call features in a Voice over Internet Protocol (VoIP) environment.

BACKGROUND OF THE INVENTION

Private premise-based telephone systems, such as those installed at correctional facilities or other controlled-environment facilities, have created a need to monitor various events occurring on the telephone lines of the system. Telephone systems at correctional facilities or other controlled-environment facilities may comprise a microprocessor-based call processing system having operational software that is capable of allowing control over telephones connected to the system. For example, the system may be programmed to prevent inmates or residents from contacting unauthorized parties or using the telephone system for fraudulent purposes. An authorization mechanism may be utilized to prevent residents from dialing unauthorized numbers directly.

Additionally, a call processing system my prevent a resident from initiating a three-way call, taking part in a conference call, or the like. However, a particular problem that is encountered in these systems is the placement of a three-way call, or the like, by a party that is authorized to be called by the resident. Once the resident is connected to an authorized number, the resident may be connected to a third party at an unauthorized number via the three-way call feature by a party at the authorized number. Care may be taken to insure that a resident does not call an unauthorized party. However, once a call is connected through the Public Switched Telephone Network (PSTN) it becomes very difficult to control the actions of the called party. Therefore, to preserve this screening activity, it is desirable to insure that the called party is in fact the person to whom the call is terminating. Therefore, it is desirable to have control of the call with respect to all the parties who are on the phone call. In short, it is desirable to prevent addition of an unknown third party to a resident call in order to preserve the integrity of the initial call screening A three-way call may be initiated when the originally called party (e.g. an authorized party outside the private telephone system) depresses the hook switch on the telephone, generating a hook flash signal. This signals the telephone central office to put the resident on hold and provide a dial tone to the originally called party. On receipt of the dial tone, the originally-called party dials the number of an unauthorized third party, and when the connection is completed, the resident and the unauthorized third party can communicate through the connection established outside the private system.

Three-way call monitoring systems which have been developed to prevent unauthorized calls according to the foregoing scenario rely on the detection of telephone signals. They typically monitor the local telephone connection for the hook flash "click" signal or associated central office signals that fall in a frequency band outside the range of frequencies produced by the human voice. These systems typically monitor signals on the local telephone line through a frequency filter designed to pass audio signals in this frequency band. A three-way call attempt may be indicated whenever signals in the frequency band have energies above a selected threshold. Some systems compare the signals with a hook flash reference signal utilizing sampling techniques implemented with a digital signal processor (DSP).

Even in a more or less conventional telephone environment these systems may not be very accurate for a number of reasons. The underlying assumptions about the frequency profile of three-way call events, i.e. the hook flash and signals generated by activating central office switches, are often wrong. For example, the hook flash signals are often modified by transmission through switches and along loaded lines, and even if assumptions about the frequency characteristics of the initial signal are accurate, these characteristics may be substantially distorted by the time the "hook flash" signal reaches a call processing system implementing three-way call detection, or the like.

Other systems and methods for detecting undesired call activity are disclosed in Salibrici, U.S. Pat. No. 5,768,355 and above-incorporated commonly owned, co-pending U.S. patent application Ser. No. 10/252,956, filed Sep. 20, 2002 and entitled THREE-WAY TELEPHONE CALL PREVENTION SYSTEM AND METHOD. Salibrici teaches using digital signal processing to identify a third-party connection. Salibrici operates by establishing a baseline ambient, or background, noise level, and detecting when the signal noise level drops below the ambient noise level. When the current signal noise level drops below the ambient noise level, the system assumes that a three-way conference call has been attempted by the called party. U.S. patent application Ser. No. 10/252,956 discloses an exemplary technique for detecting three-way calls, which in general includes detecting a call signal level, determining if the call signal level is below a predetermined silence level threshold, and measuring a duration the call signal level remains below the predetermined silence level threshold.

Internet protocol ("IP") is a routing protocol designed to route traffic within a network or between networks. VoIP is a method for providing voice capabilities over an IP network, such as the Internet or an intranet. In such networks data packets are sent to and from communication sites to facilitate communication. In communication systems utilizing a VoIP protocol, the packets are commonly referred to as datagrams. In typical VoIP networks, each communication site sends datagrams to other communication sites with which they are in communication. There are different approaches to sending datagrams. Control signals per ITU recommendation H.323, and audio-based media streams using Real-Time Transport Protocol (RTP) per Internet RFC 1889, may be applied. Alternatively, control signals could be applied using other protocols such as Session Initiation Protocol (SIP) per Internet RFC 2543.

SUMMARY

Embodiments of the present invention are directed generally to systems and methods for detecting and/or preventing unauthorized call activity in a VoIP environment. According to certain embodiments, a call is connected in which at least one party is a VoIP call party, and resulting VoIP signals for the call are monitored for detecting unauthorized call activity. In a first situation wherein a call is an interconnection between a PSTN-based call and a VoIP call, such as a SIP-based or RTP-based call, different methods for detection of VoIP signals that indicate or include suspend and resume events may be used to detect unauthorized call activity, such as initiation of a three-way call. For example, when the user on a PSTN line attempts to activate a traditional form of three-way calling, or undertakes similar unauthorized call activity, embodiments of the present invention detect various VoIP signals from which the three-way call attempt may be determined. As used herein, the phrase "VoIP signals" may refer to various out-of-band and/or in-band signaling, either of which may be a part of VoIP data packets or may be separate VoIP-related instructions. Appropriate action may then be taken by calling systems employing an embodiment of the present invention upon detection of unauthorized call activity, such as intervening in the call to warn the parties to not participate in a three-way call (e.g., via an interactive voice response unit or the like), disconnecting the call, monitoring the call for investigative purposes, and/or the like. As an example of use of in-band signals for three-way call detection, the return of Voice Activation Detection (VAD) idle noise is used by an embodiment of the present invention, where VAD idle noise being received may be treated as a silence period and used as an indicator of initiation of a three-way call. Examples of out-of-band signaling that might be used to detect unauthorized call activity might include Signaling System 7 (SS7) signaling, or the like.

In situations wherein both parties to a call are employing VoIP, signaling that occurs between traditional VoIP devices may be monitored to determine when one VoIP device invites another party or another gateway to join into the existing VoIP call. Again, a call processing system employing an embodiment of the present invention may take appropriate action in response to detection of an attempt to initiate a three-way call. Alternatively, in a VoIP-only environment, the addition of third parties to a call may be disallowed at the time the call is established to avoid the need to later detect attempts to initiate three-way calling.

Certain embodiments of the present invention also employ an ability to monitor a call for cadence, frequency, amplitude, phonetics, tonal combinations, and/or other attributes that occur in speech, and to use such information to determine the number of voices taking part in a call. Thus, in accordance with an embodiment of the present invention, the addition of a unique set of voice variables may show that a third party has joined a call. Again, a system employing an embodiment of the present invention may take appropriate action such as intervening to warn the parties to not participate in a three-way call, disconnecting the call, monitoring the call for investigative purposes or the like. An ability to monitor a call may be used to monitor for and identify other sounds of interest (e.g., from background sounds of one or more parties on the call), such as that of a gunshot, a scream, outdoor sounds (birds, wind noise, etc.), DTMF, recording tones, alarms, sirens, etcetera. An investigator may be alerted as a result of the detection of the sound of the call flagged for investigation.

Embodiments of the present invention have particularly advantageous applicability within controlled-environment facilities. Examples of controlled-environment facilities include correctional facilities (e.g., municipal jails, county jails, state prisons, federal prisons, military stockades, juvenile facilities, and detention camps), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents. As described further herein, embodiments of the present invention have particular applicability within correctional facilities, but the concepts described herein may likewise be employed in other controlled-environment facilities.

Certain embodiments of the present invention make use of data concerning a resident of a controlled-environment facility that is placing a call, and/or data related to a called party or number, to determine if there is a propensity for a three-way call situation to arise in a call placed by the resident of the facility. This information may be provided by a controlled-environment facility's call management system, a controlled-environment facility's information management system, or the like associated with a controlled-environment facility in which the resident resides.

As a result of a determination that an elevated propensity for a three-way calling situation exists, sensitivity of three-way call detection methods and/or systems, such as discussed above and/or disclosed in the incorporated references, may be elevated for a call placed by that resident and/or a call placed to a party or number. Alternatively or additionally, if a call has a heightened propensity for a three-way call situation to arise, the response applied by a system employing an embodiment of the present invention may be elevated. For example, if a three-way call attempt would normally only be logged or otherwise noted for possible further investigation, the parties to the call may be warned, and in a situation where the call's parties might normally only be warned, a call may be disconnected when an attempt to initiate a three-way call is detected.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

In a VoIP environment, particular problems arise for detecting three-way calls. Triggers that might normally be used to detect initiation of a three-way call in a conventional PSTN environment, or the like, may not be passed in a VoIP-based call. For example, in a packetized VoIP environment it is very difficult to detect a hook flash or silence. Packets oftentimes will not pass a hook flash, or similar sound, or pass silence. Similarly, lower so-called "levels of silence" are typically screened out of packets during the creation of the packets.

As for "level of silence" or similar triggers that may be used in three-way call detection within a VoIP environment, typically when sound drops below some threshold level it is deemed to be silence and not transmitted. VoIP data transmission bandwidth usage may be minimized through the use of Voice Activation Detection (VAD), or other methods. VAD allows a data network carrying voice traffic over the Internet to detect the absence of audio and conserve bandwidth by preventing the transmission of "silent packets" over the network. Most conversations include about 50% silence. VAD (also called "silence suppression") can be enabled to monitor signals for voice activity so that when silence is detected for a specified amount of time, the application informs the Packet Voice Protocol and prevents the encoder output from being transported across the network. VAD may also be used to forward idle noise characteristics (sometimes called ambient or comfort noise) to a remote IP telephone or gateway. A standard for digitized voice, 64 Kbps, is a constant bit rate whether the speaker is actively speaking, is pausing between thoughts, or is totally silent. Without idle noise giving the illusion of a constant transmission stream during silence suppression, the listener would be likely to think the line had gone dead. As a result, sounds at different levels of silence are not passed in a VoIP call. Therefore, since conventional three-way call detection may analyze different "thresholds of silence" to determine whether or not a caller is "away" setting up a three-way call, conventional three-way call detection in VoIP calls is problematic.

As for a hook flash or similar triggers, a sharp click occurs when a switch hook is depressed. This click is usually proceeded by a period of silence, and since a VoIP system would not necessarily be transmitting encoded sound packets during the silence period, the sharp click is typically the first sound that starts the VoIP system transmitting encoded sound packets again. However, a VoIP system will not typically react fast enough to catch the click, and therefore the VoIP system may not transmit the click at all or truncate the click rendering it unrecognizable by a conventional three-way call detection system. For example, a rising edge of the click may trigger a VoIP filter to start passing packets again, yet not transmit the click itself. More specifically, VoIP systems may have jittering timing and as a result a hook flash click may be completely screened out in the VoIP transmission, similar to the "levels of silence" discussed above, together making both silence detection and/or click detection problematic for use in three-way call detection in a VoIP environment. Therefore, use of VoIP creates new issues in regards to detecting and/or preventing three-way call activity.

Figure 1:
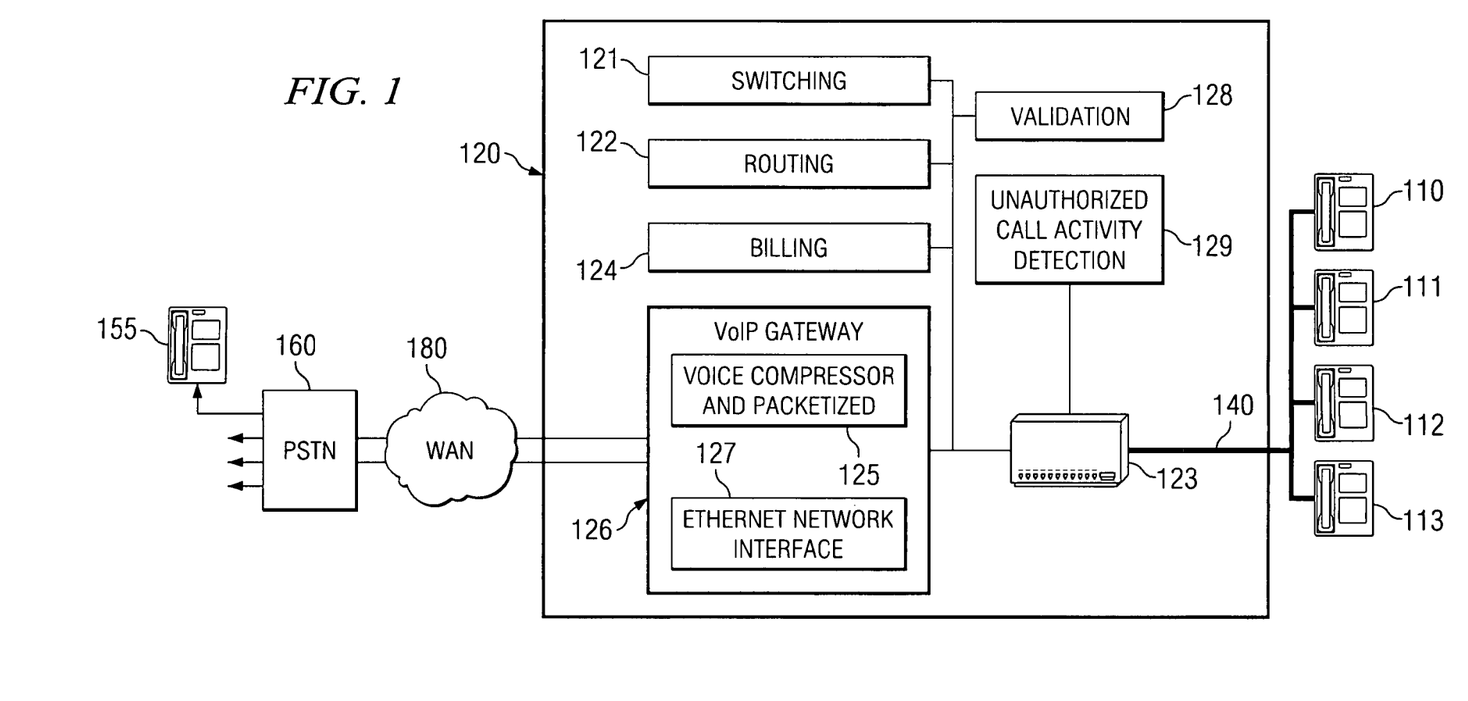
FIG. 1 is a block diagram of a telephone system adapted in accordance with an exemplary embodiment of the present invention.

FIG. 1 shows telephone communication system 100, adapted in accordance with an exemplary embodiment of the present invention. Telephone communication system 100 of the embodiment illustrated in FIG. 1 includes a plurality of telephone terminals 110-113 disposed at a location for which calling services are to be provided. The location may, for example, comprise a prison or other controlled-environment facility in which the use of telephones 110-113 is monitored and controlled.

In order to better aid the reader in understanding the concepts of the present invention, telephone communications systems and methods of the present invention are described herein with reference to configuration and use in providing calling services to a correctional facility, such as a jail, a prison or a similar controlled-environment facility. However, it should be appreciated that call processing systems and methods of the present invention are not necessarily limited to use with respect to such correctional facilities. For example, embodiments of the present invention may likewise be utilized with respect to any number of other environments, such as hospitals, nursing homes, camps, dormitories, businesses, residences, kiosks, etcetera.

Telephone terminals 110-113 may not only comprise telephone handsets but may also include general-purpose processor-based devices such as personal computers (PCs), personal digital assistants (PDAs), kiosks, or the like. Terminals 110-113 are preferably connected to processor-based call processing system 120 by wire lines or wireless links, broadly designated 140. Processor-based call processing system 120 may comprise a programmable computer having a central processing unit (whether general purpose or application specific), memory, and appropriate input/output interfaces, which are operable under an instruction set defining operation as described herein. All or any portion of call processing system 120 may be disposed within a facility it serves, in an outside central location, or the processes shown provided by processor-based call processing system 120 may be provided in a decentralized manner by distributed processing outside and/or inside the facility. Communications links 140 may comprise analog voice lines, such as those associated with plain old telephone service (POTS), digital communication links such as those used between a digital private branch exchange (PBX) and its associated user stations, and/or Ethernet or wireless communications links (e.g. for VoIP communication where terminals 110-113 are multimedia terminals, VoIP phones, or the like), as examples. Line interface 123 provides interfacing between the signals native to terminals 110-113 and a processor or processors of call processing system 120.

VoIP gateway 126 may provide voice connectivity via WAN 180. WAN 180 may comprise any data network, such as an intranet, an extranet, the Internet, a public network, a private network, and/or the like. Although illustrated as a WAN, it should be appreciated that embodiments of the present invention may utilize data networks such as a local area network (LAN), a metropolitan area network (MAN), an intranet, an extra net, the Internet, and/or the like, in combination with, or in the alternative to, a WAN.

Terminals 110-113 may be placed in voice communication with any of a number of user terminals via VoIP gateway 126 and WAN 180. For example, telephone terminal 155 connected to PSTN 160 may be placed in communication with telephone terminal 110, via VoIP gateway 126 and WAN 180, perhaps using a corresponding VoIP gateway, such as may be disposed at an edge of WAN 180 and coupled to PSTN 160, or otherwise associated with WAN 180 and/or PSTN 160. Additionally or alternatively, terminals 110-113 may be placed in communication with devices such as video phones, multimedia computers, cellular phones, personal digital assistants (PDAs), and/or the like via VoIP gateway 126 and WAN 180, whether such devices are coupled to WAN 180 or PSTN 160.

VoIP gateway 126 includes compressor and packetizer 125 and network interface 127. Compressor and packetizer 125 produces compressed data packets from the telephony signals. These packets are processed in network interface 127 so that they can be applied through WAN 180 to corresponding VoIP gateway. The telephone signals may be decompressed and depacketized by VoIP gateway and distributed to a public switch of PSTN 160. VoIP gateway 126 may also decompress and depacketize incoming VoIP data packets to provide telephony signals to terminals 110-113, particularly where terminals 110-113 are not capable of decompression and depacketization.

In operation according to embodiments of the present invention, terminals 110-113 are selectively connected to offsite PSTN 160 via WAN 180 and VoIP gateway 126. Processor-based system 120 preferably selectively connects appropriate ones of terminals 110-113 with the VoIP gateway 126 for completion of desired calls. VoIP gateway 126 utilizes internet protocols to establish a packet-switched network connection (in contrast to a circuit-switched network connection of the PSTN) between a calling and called party to thereby connect a desired call.

VoIP gateway 126 of a preferred embodiment is provided to service and control VoIP communications. Various types of VoIP communications may be effectively managed and controlled in accordance with embodiments of the present invention by VoIP gateway 126. Voice data may be processed by means of a vocoder (Voice Coder/Decoder), as may be provided in VoIP gateway 126. Voice coding and decoding as utilized according to embodiments of the invention may implement one or more of several standard schemes, such as ITU recommendation G.723.1, G.729, or G.711 among others.

The illustrated embodiment of FIG. 1 includes functionality of a call processing platform integrated with that of a call processing gateway. Of course, in other embodiments, such functionality may be separated. In the exemplary embodiment of FIG. 1, call processing system 120 is shown including switching control block 121, routing control block 122, billing control block 124, validation control block 128, and unauthorized call activity detection control block 129 in addition to line interface 123 and VoIP gateway 126. Typically, controlled-environment facilities, such as is described in the present example, have rules and regulations regarding telephone usage by residents. Accordingly, switching control block 121, routing control block 122, billing control block 124, validation control block 128, and unauthorized call activity detection control block 129 may be utilized to cooperatively control, route, connect, disconnect, and account for calls. Unauthorized call activity detection control block 129 may take the form of an agent program or the like. The functions represented by each of switching control block 121, routing control block 122, billing control block 124, validation control block 128, and unauthorized call activity detection control block 129 may be implemented by equipment disposed within a facility served, in an outside central location, or the processes may be provided in a decentralized manner by distributed processing outside and/or inside the facility.

A user of one of telephones 110-113 may place the telephone in an off-hook condition and dial or otherwise provide user and/or account identification information, in addition to providing a destination number or other information with respect to a desired call to be placed. Validation control block 128, perhaps in cooperation with a call application management system and/or a call treatment system, may operate to verify a) the identity of the calling party, b) that the calling party is authorized to place a call, and c) that the called party will receive calls or is authorized to receive calls from the calling party.

Unauthorized call activity detection control block 129 is preferably operable to monitor a connected call to provide call intelligence for use in determinations with respect to allowing a particular call to be continued and/or other call control features to be invoked. According to embodiments of the present invention, unauthorized call activity detection control block 129, such as the aforementioned agent, provides real-time intelligence with respect to fraudulent or otherwise unauthorized activity being attempted during a call, such as unauthorized three-way call detection, as discussed in greater detail below.

It should be appreciated that call processing functionality may be provided in a call flow at one or more points based upon various considerations. For example, VoIP gateway 126 and/or unauthorized call detection functionality 129 may be disposed in a number of configurations and/or locations, such as disclosed in above incorporated U.S. patent application Ser. No. 10/800,473, entitled "CALL PROCESSING WITH VOICE OVER INTERNET PROTOCOL TRANSMISSION." The illustrated embodiment shows unauthorized call activity detection control block 129 coupled to line interface 123, disposed in the call flow external to the VoIP data stream, to operate with respect to telephony signals which have been decompressed and depacketized by VoIP gateway 126. However, as discussed in greater detail below, embodiments of the present invention may gather information from the VoIP data stream to provide at least one aspect of three-way call detection. Thus, embodiments of the present invention may dispose various aspects of call processing functionality, particularly unauthorized call activity detection control block 129, in a call flow differently, whether inside or outside of the VoIP data stream, than as shown in FIG. 1.

Figure 2:
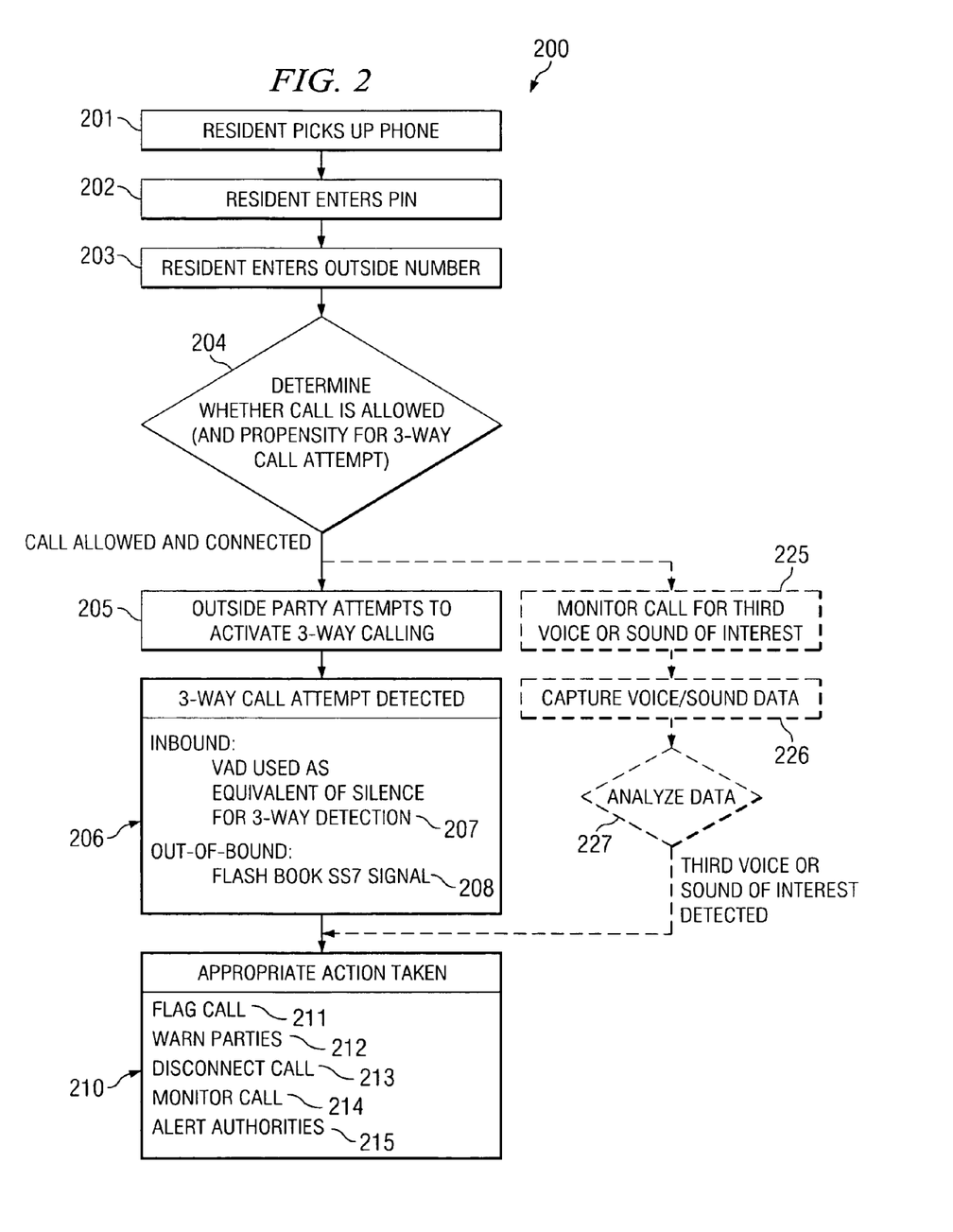
FIG. 2 is a flowchart of unauthorized call activity detection according to an embodiment of the present invention.
Figure 3:
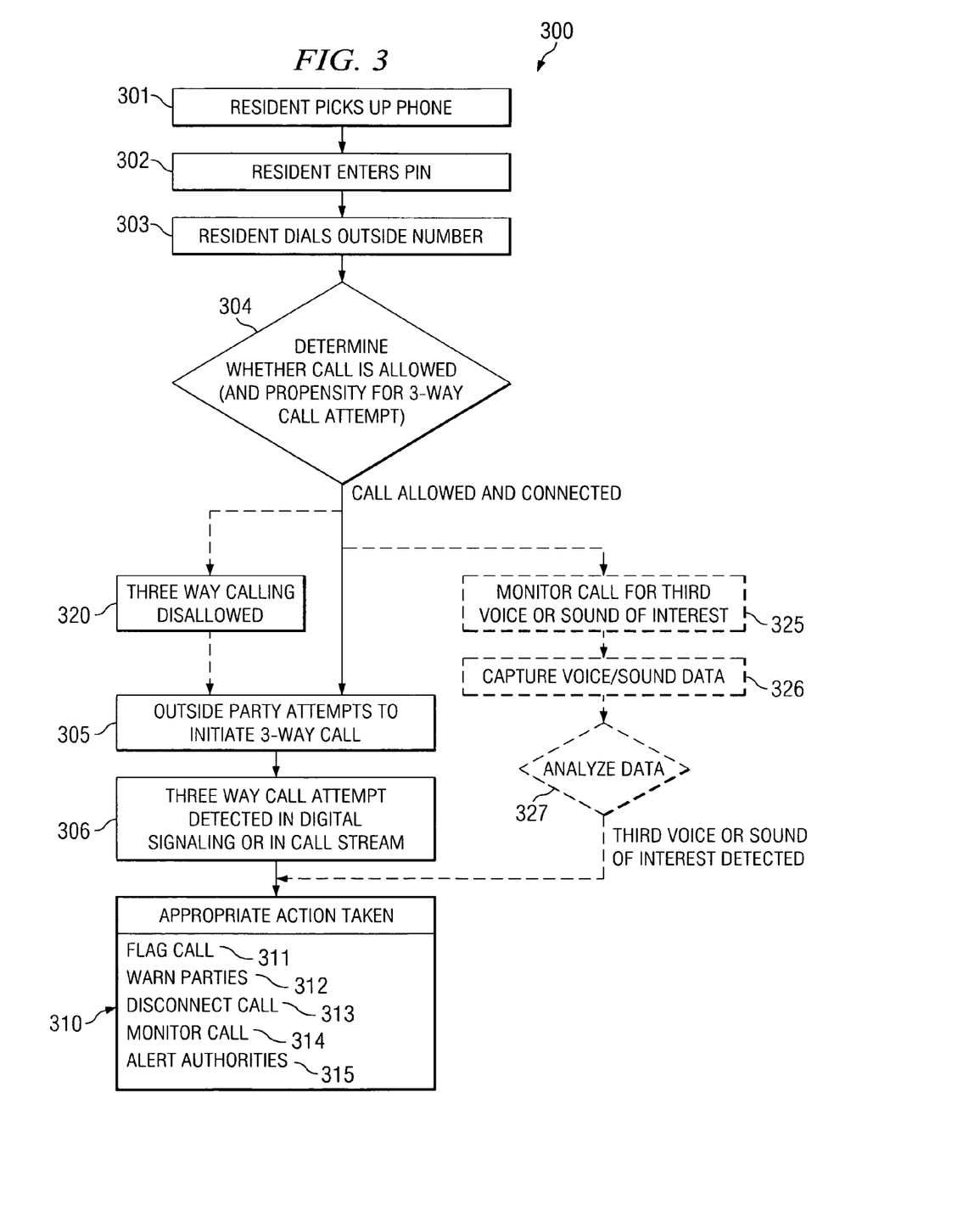
FIG. 3 is a flowchart of unauthorized call activity detection according to another embodiment of the present invention.

FIGS. 2 and 3 are flowcharts of embodiments of methods employed in accordance with the present invention for unauthorized call activity detection, such as three-way call detection and/or prevention, in a VoIP environment. A first exemplary operational flow 200 according to one embodiment is illustrated in FIG. 2, which may be used for three-way call detection and/or prevention for a call between a conventional PSTN connected caller, such as a PSTN-based connection provided to a person outside of a controlled-environment facility, and a VoIP caller, such as a SIP-based connection provided to a user of phone 110 of call system 100 of FIG. 1.

The PSTN-based call is joining a VoIP-based call at a gateway, such as gateway 126 of FIG. 1.

At 201 a resident of a controlled-environment facility picks up a phone, such as one of phones 110-113 of controlled phone system 100 illustrated in FIG. 1, to place a call. The resident then typically enters a personal identification number or the like at 202. At 203 the resident then enters a number outside the facility that he or she wishes to call. At 204 call processing and/or facility management functionality, such as described above, determines if the resident is allowed to make calls and/or call the entered outside telephone number and connects the call, if allowed. In this example, a VoIP call may be established for the resident using SIP and interconnected via a PSTN to the outside number using conventional PSTN switching equipment, such as a terminating switch, typically employing out-of-band SS7 or PRI digital signaling. Then the call is connected to the called party off the terminating switch.

Data concerning the resident, such as may be maintained by a controlled-environment facility call management system, a controlled-environment facility information management system, or the like, and/or data related to a called party or number may be used at 204, to determine if there is a propensity for a three-way call situation to arise in a particular call Some of the variables that could be considered at 204 might include past attempts to initiate a three-way call or other unauthorized call activity; past attempts at other types of fraud; the resident's payment status, billing activity, payment history, calling activity, calling history; the nature of the facility the resident is calling from (e.g. the average length of stay in the facility); and/or the like. As a result of a determination at 204 that an elevated propensity for a three-way calling situation exists for a particular call, various steps may be taken. For example, if it is determined at 204 that the resident or called party has participated in calls in the past in which an attempt to invoke a three-way call was detected, a sensitivity of three-way call detection may be elevated at 204.

At 204 a determination may also be made that a three-way call or other call features are allowed for a particular call. For example, if the called party is an attorney or bail bondsman, three-way calling may be allowed in order for the called attorney or bail bondsman to "conference-in" needed parties (e.g. a witness, surety, etc.)

Otherwise, when the PSTN call goes off hook to initiate a three-way call or the like, there are different types of out-of-band signaling coming from an SS7 environment of the PSTN-based call indicating a suspend event reaches the gateway and then is translated to out-of-band signaling in a SIP environment. In the example of FIG. 2 the outside party on a PSTN line attempts to undertake unauthorized call activity, such as activate a traditional form of three-way calling at 205. At 206, various out-of-band and/or in-band signaling are detected that may indicate a suspend event and/or a resume event indicating that a party has returned to the call.

By way or example, use of in-band signals for three-way call detection might include monitoring return of VAD idle noise at 207 as the equivalent of silence. For example, at 207 one embodiment of the present invention may treat the period where VAD idle noise being received as a time frame of silence period for detection of an attempt to initiate a three-way call. VAD typically will cut a call in and out rather quickly to conserve bandwidth. Thus, the present systems and methods for unauthorized call activity detection may look for longer periods of VAD activity, such as would be generated by a VoIP gateway as a result of a party hook flashing off of a call, which would result in the VoIP gateway only receiving silence from the PSTN connected caller. Embodiments of the present invention may, as mentioned, treat the VAD as silence for purposes of unauthorized call activity detection, which might also look for timing windows of such silence periods indicative of establishing a three-way call. In certain embodiments, such in-band VAD detection of idle noise may be compared against a simulated model of an approximate description of the interaction between sources and the underlying network. The interaction of a source with the rest of the system may be derived through an iterative procedure that evaluates feedback that a source receives from the network, for example.

An example of out-of-band signaling that may be used to detect three-way calling activity may include monitoring of SS7 PSTN signaling that indicates the outside party has done something, such as a flashhook (208), to initiate a three-way call. Within the PSTN environment, initiating a three-way or answering a call waiting call, such as by use of a flash hook, may generate an SS7 suspend event within the network. The generated SS7 suspend message is an indication to the opposite end of the call, in this case the calling system associated with the resident of the controlled-environment facility that the other end point in the call, the outside party, is going to stop sending information. At a later point in time when the hook flash happens a second time to either come back on the call with another party or to resume this call from a call waiting event, there will be a resume event that is sent. When the VoIP gateway receives these events, it will transfer those events into the SIP network.

As another example, in certain embodiments a three-way call attempt may be deduced from a model of unacceptable packet loss which persists from a predetermined time period. For example, the packet loss for a monitored call may be compared against a simulated model of an approximate description of the interaction between sources and the underlying network. The interaction of a source with the rest of the system may be derived through an iterative procedure that evaluates feedback that a source receives from the network.

The method of transfer into the SIP network varies depending on the gateway. For example, a Generic Description Table (GDT) might be used to translate the SS7 signaling into a SIP message, which may take the form of ASCII text. Another method of transfer of the suspend and resume event into the SIP network might employ a variation on the SIP protocol known as SIP Trunking (SIP-T), which is adapted to carry SS7 network information over the SIP network such that the information may be converted back into SS7 information. A third method used to transfer a suspend and resume event into an SIP network might be termed a direct correlation. The SIP protocol carries the call setup information, but the protocol that carries the voice information is RTP. Within the RTP information there is a new signaling sent out that indicates that a new set of RTP information that describes the voice content is being received. A suspend event may be identified within the RTP information which might take the form of an indication that the target data is being sent to is no longer present. This may result in an SIP message that a terminal is going into a receive only mode and no longer transmitting data. A resume event may take the form of an RTP message that resumes the entire connection.

In accordance with an embodiment of the present invention, a call involving a resident may be monitored to listen to all of the voices engaged in the call. Thus, additionally or alternatively, at 225 the exemplary embodiment may also monitor the call established at 204 for cadence, frequency, and/or other attributes that occur in speech, and capture data related thereto at 226. At 227 the captured data may be analyzed to determine the number of voices taking part in a call. Using information gathered from the voices such as frequencies, cadence, amplitude and other variables that might occur, detection capabilities that are able to recognize the difference between foreground and background voices may be used at 227 to determine the number of parties that are engaged in the call. For example, systems employing an embodiment of the present invention might have certain voice characteristics data for the resident and voice characteristics data for the outside called party might have been previously gathered during earlier calls or at the beginning of the current call. This data may be used to make a determination at 227 that a third party, who's voice characteristics data does not match the resident or called party has joined the call. If at 227 it is determined that an additional set of unique voice variables has joined a call, via a prohibited three-way call or by other means, appropriate action may be taken at 210, as discussed in greater detail below.

In identifying the number of parties on a call it may be helpful to differentiate the call legs and what call leg a voice appears on. For example, a call from a resident of a prison or similar facility may contain many echo voices, due to the physical properties of the facility and the proximity of other individuals. Therefore, at 225-227 it may be more advantageous to monitor the leg of the call coming from the called party to the resident for an additional voice or voices.

Monitoring a call at 225-227 may also, or alternatively, include monitoring to identify other sounds of interest, such as a gunshots, a scream, people in very panicked states or any other things that might be of interest to an investigator. An investigator may be alerted at 214 as a result of the detection of such a sound of interest or the call flagged for investigation at 211, as discussed in greater detail below.

Upon detection of an attempt to initiate a three-way call at 206, or detection of a new voice or sound of interest at 225-227, appropriate action may be taken by calling systems employing an embodiment of the present invention at 210. Such appropriate action might include flagging the call for investigation at 211, intervening at 212 to warn the parties to not participate in a three-way call, disconnecting the call at 213, monitoring the call for investigative purposes at 214, alerting authorities at 215, and/or the like. Alternatively or additionally, if it is determined at 204 that a call has a heightened propensity for a three-way call situation to arise, the response applied at 210 upon detection of an attempt to initiate a three-way call at 206, may be elevated. For example, if a three-way call attempt would normally only be logged or otherwise noted for possible further investigation at 211, the call parties may be warned (212), and in a situation where the call parties might normally only be warned at 212, a call may be disconnected (213) when an attempt to initiate a three-way call is detected.

Another method embodiment, 300, is illustrated in FIG. 3 for three-way call detection and/or prevention in a call where both call parties are employing VoIP. At 301 a resident of a controlled-environment facility picks up a phone, such as a phone of a controlled phone system, to place a call. The resident then typically enters a personal identification number or the like at 302 and at 303 the resident enters a number, outside the facility, that he or she wishes to call. At 304 call processing and/or facility management functionality determines if the resident is allowed to make calls and/or call the entered outside telephone number and connects the call, if allowed. In this example, a VoIP call may be established for the resident using SIP and interconnected via the system VoIP gateway and a PSTN, which may also employ a VoIP gateway or the like to complete the call.

Similar to as discussed above concerning step 204 of FIG. 2, data concerning the resident, such as may be maintained by a controlled-environment facility call management system, a controlled-environment facility information management system, or the like, and/or data related to a called party or number may be used at 304, to determine if there is a propensity for a three-way call situation to arise in a particular call. As a result of a determination at 304 that an elevated propensity for a three-way calling situation exists for a particular call, various steps may be taken. For example, sensitivity of three-way call detection may be elevated at 304.

At 304 a determination may also be made that a three-way call or other call features are allowed for a particular call. For example, if the called party is an attorney or bail bondsman, three-way calling may be allowed in order for the called attorney or bail bondsman to "conference-in" needed parties (e.g. a witness, surety, etc.)

At 305 in the illustrated example of FIG. 3, the called, outside party attempts to activate three-way calling. In a VoIP-to-VoIP call where the transmission is being handled between end points or call agents within a VoIP network changes in the routing of a call are typically noted in signaling that occurs out-of-band from the voice, in SIP or other protocol handling the set-up and routing of the call. Once a VoIP to VoIP call is established, any routing change request, such as would occur when a three-way call is initiated, results in SIP updates, or the like, being sent to effect such routing changes. At 306 digital signaling, such as SIP signaling, that occurs between traditional VoIP devices may be monitored to determine when one VoIP device attempts to invite a third party or another gateway to join into the existing VoIP call.

In-band unauthorized call activity detection may also be employed in accordance with certain embodiments of the present invention for VoIP-to-VoIP calls. The RTP stream, or the like that is transmitted as voice data might include a sequence numbers commonly referred to as internal session identifiers or internal sequence numbers, per Internet RFC specifications. Whenever a remote gateway reinitiates some element of a data stream, even though it may not have changed terminating information, the gateway may change internal session identifiers or internal sequence numbers per RFC specifications. Thus, if at 306 a determination is made that internal session identifiers, internal sequence numbers, or the like of a voice data stream has changed in a manner consistent with initiation of unauthorized call activity, such as a three-way call, it may be determined that unauthorized call activity is taking place. For example a jump in sequence numbers that does not correlate in time, or a change in session IDs, can be used in accordance with an embodiment of the present invention as an indication that a remote point in a VoIP-to-VoIP call has substantially changed the content of the stream.

Alternatively, in a VoIP-only environment, such as employed in the exemplary operational flow 300 of one embodiment, unauthorized call activity, such as the addition of third parties to a call, may be disallowed (320) at the time the call is established, such as at 304, to completely block, and possibly avoid the need to detect, attempts to initiate three-way calling. The disallowance at 320 may be accomplished by setting call features enabled for the VoIP call parties to not include unauthorized call features, such as three-way calling.

Similar to as discussed above concerning steps 225-227 of FIG. 2, a call involving a resident may be monitored to listen to all of the voices engaged in the call. At 325, call processing system 120 of the exemplary embodiment may monitor the call established at 304 for cadence, frequency, and/or other attributes that occur in speech. Monitoring a call at 325 may also, or alternatively, include monitoring to identify other sounds of interest, such as a gunshots, a scream, etcetera. At 326, data associated with the voices or sounds may be captured. At 327, the captured data may be analyzed to determine the number of voices taking part in a call. If at 327 it is determined that an additional set of unique voice variables has joined a call, via a prohibited three-way call or by other means, or that a sound of interest has occurred during the call appropriate action may be taken at 310.

At 310, the call processing system 120 employing an embodiment of the present invention may take appropriate action in response to detection of an attempt to initiate a three-way call at 306, such as flagging the call for investigation at 311, intervening at 312 to warn the parties to not participate in a three-way call, disconnecting the call at 313, monitoring the call for investigative purposes at 314, alerting authorities at 315, and/or the like. Alternatively or additionally, if it is determined at 304 that a call has a heightened propensity for a three-way call situation to arise, the response applied at 310, upon detection of an attempt to initiate a three-way call at 306, may be elevated. For example, if a three-way call attempt would normally only be logged or otherwise noted for possible further investigation at 311, the call parties may be warned (312), and in a situation where the call parties might normally only be warned at 312, a call may be disconnected (313) when an attempt to initiate a three-way call is detected.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for providing call processing in a controlled-environment facility, comprising:
   receiving a request to place a call from a terminal accessed by a calling party in the controlled-environment facility;
   connecting the call to a called party outside the controlled-environment facility via a Voice over Internet Protocol (VoIP) gateway between the terminal and a public switched telephone network (PSTN) or between the terminal and a wide area network (WAN); and
   detecting three-way call activity in the call by monitoring VoIP signals transmitted between the VoIP gateway and the terminal.

2. The method of claim 1, wherein monitoring the VoIP signals comprises detecting voice activation detection (VAD) idle noise in the VoIP signals.

3. The method of claim 1, wherein the VoIP signals are transmitted using a real-time transport protocol.

4. The method of claim 2, wherein said monitoring further comprises determining whether voice activation detection (VAD) idle noise persists for a predetermined time frame.

5. The method of claim 1 wherein said monitoring comprises detecting packet loss for a predetermined time to determine presence of the three-way call activity.

6. The method of claim 1, further comprising performing an operation responsive to detecting the three-way call.

7. The method of claim 6, wherein said operation performed comprises at least one of flagging the call for investigation, intervening to warn the called party and the calling party to not participate in the three-way call activity, disconnecting the call, monitoring the call for investigative purposes, and alerting authorities.

8. The method of claim 1, further comprising determining likelihood that the calling party or the called party will initiate the three-way call activity.

9. The method of claim 8, wherein said determining of the likelihood is based on at least one of (i) past attempts by at least one of the called party or the calling party to carry out a three-way call, (ii) past attempts by at least one of said calling party or the called party to conduct a fraudulent activity, (iii) call payment status of the called party or the calling party, (iv) call billing activity of the called party or the calling party, (v) call payment history of the called party or the calling party, (vi) calling activity of the called party or the calling party, (vii) calling history of the calling party, and (viii) the location of the called party or the calling party.

10. The method of claim 8, further comprising increasing a level of said monitoring in response to determining that the calling party or the called party is likely to initiate the three-way call activity.

11. The method of claim 8, further comprising modifying an operation to be taken in response to detecting the three-way call based on the likelihood that the called party or the calling party will initiate the three-way call.

12. The method of claim 1, further comprising allowing said three-way call activity to continue responsive to determining that the called party is authorized to conduct a three-way call.

13. A system for providing call processing in a controlled-environment facility, comprising:
   a Voice over Internet Protocol (VoIP) gateway configured to receive a request to place a call from a terminal in the controlled-environment facility, the VoIP gateway connecting the call to a called party outside the controlled-environment facility via a Voice over Internet Protocol (VoIP) gateway between the terminal and a public switched telephone network (PSTN) or between the terminal and a wide area network (WAN); and
   an agent between the VoIP gateway and the terminal, the agent configured to detect three-way call activity by monitoring VoIP signals.

14. The system of claim 13, wherein the agent is configured to detect voice activation detection (VAD) idle noise to determine the three-way call activity.

15. The system of claim 13, wherein the VoIP signals are communicated in a real-time transport protocol.

16. The system of claim 13, wherein the agent is configured to detect packet loss for a predetermined time to determine presence of the three-way call activity.

17. The system of claim 13, wherein said agent is configured to determine a three-way call attempt based on voice activation detection (VAD) idle noise persisting for a predetermined time frame.

18. The system of claim 13, wherein said gateway disallows initiation of the three-way call by the calling party or the called party during the VoIP call.

19. The system of claim 13, wherein said agent is configured to monitor said call to detect a sound of interest.

20. The system of claim 19, wherein said sound of interest is the voice of a third party.

21. The system of claim 19, wherein said sound of interest is at least one of a gunshot, a scream, outdoor sounds, dual-tone multi-frequency (DTMF), Recording tones, alarms and sirens.

22. The system of claim 13, wherein said agent is configured to monitor said call to collect data related to at least one of speech cadence, frequency, amplitude, phonetics, tonal combinations, the agent further configured to determine the number of voices taking part in said call based on the data collected.

23. The system of claim 13, wherein said agent is configured to perform an operation responsive to detecting the three-way call.

24. The system of claim 13, wherein the operation performed by said agent comprises taking at least one of flagging the call for investigation, intervening to warn the called party and the calling party to not participate in the three-way call activity, disconnecting the call, monitoring the call for investigative purposes, and alerting authorities.

25. The system of claim 13, wherein said agent is also configured to determine likelihood that the called party or the calling party will initiate the three-way call activity.

26. The system of claim 25 wherein said agent determines the likelihood based on at least one of (i) past attempts by at least one of the called party or the calling party to carry out the three-way call, (ii) past attempts by at least one of said called party or the calling party to conduct a fraudulent activity, (iii) call payment status of the called party or the calling party, (iv) call billing activity of the called party or the calling party, (v) call payment history of the called party or the calling party, (vi) calling activity of the called party or the calling party, (vii) calling history of the called party or the calling party, and (viii) the location of the called party of the calling party.

27. The system of claim 25, wherein said agent is configured to increase a level of monitoring for the call responsive to determining that the calling party or the called party is likely to initiate the three-way call.

28. The system of claim 25, wherein said agent is configured to modify an operation to be taken in response to detecting the three-way call based on the likelihood that the called party or the calling party will initiate the three-way call.

29. The system of claim 13, wherein said agent is configured to allow the tree-way call activity to continue responsive to determining that the called party is authorized to conduct a three-way call.

30. A method for providing call processing in a controlled-environment facility, comprising:
   receiving a request to place a call from a terminal in the controlled-environment facility;
   connecting the call to a called party outside the controlled-environment facility via a Voice over Internet Protocol (VoIP) gateway between the terminal and a public switched telephone network (PSTN) or between the terminal and a wide area network (WAN);
   receiving an out-of-band signal associated with the call from the PSTN; and
   detecting a three-way call activity in the call by analyzing the received out-of-band signal at the VoIP gateway.

31. The method of claim 30, wherein detecting the three-way call activity comprises detecting a suspend signal in the out-of-band signal indicating that the PSTN will suspend sending information associated with the call to the VoIP gateway.

32. The method of claim 31, further comprising translating the out-of-band signal from the PSTN into an out-of-band signal of Session Initiation Protocol (SIP).

33. The method of claim 30, wherein detecting the three-way call activity further comprises detecting a resume signal in the out-of-band signal indicating that the PSTN will resume sending information associating with the call to the VoIP gateway.

34. The method of claim 30, wherein the out-of-band signal is a signaling system 7 (SS7) signal.

35. The method of claim 30, wherein detecting the three-way call activity further comprises detecting a three-way calling invitation signal from the PSTN.

36. A system for providing call processing in a controlled-environment facility, comprising:
   a line interface for coupling to a plurality of terminals in the controlled-environment facility; and
   a Voice over Internet Protocol (VoIP) gateway coupled between the line interface and a public switched telephone network (PSTN) or between the line interface and a wide area network (WAN), the VoIP gateway configured to:
     receive a request to place a call from one of the plurality of terminals in the controlled-environment facility;
     connect the call to a called party outside the controlled-environment facility via the PSTN;
     receive an out-of-band signal associated with the call from the PSTN; and
     detect a three-way call activity in the call by analyzing the received out-of-band signal at the VoIP gateway.

37. The system of claim 36, wherein the VoIP gateway is configured to detect the three-way call activity by detecting a suspend signal in the out-of-band signal indicating that the PSTN will suspend sending information associated with the call to the VoIP gateway.

38. The system of claim 36, wherein the VoIP gateway is further configured to translate the out-of-band signal from the PSTN into an out-of-band signal of Session Initiation Protocol (SIP).

39. The system of claim 36, wherein the VoIP gateway is further configured to detect the three-way call activity by detecting a resume signal in the out-of-band signal indicating that the PSTN will resume sending information associating with the call to the VoIP gateway.

40. The system of claim 36, wherein the out-of-band signal is a signaling system 7 (SS7) signal.

41. The system of claim 36, wherein the VoIP gateway is further configured to detect the three-way call activity by detecting a three-way calling invitation signal from the PSTN.

* * * * *

UNITED STATES PATENT AND TRADEMARK OFFICE
CERTIFICATE OF CORRECTION

| | | |
|---|---|---|
| PATENT NO. | : 7,916,845 B2 | Page 1 of 1 |
| APPLICATION NO. | : 11/403547 | |
| DATED | : March 29, 2011 | |
| INVENTOR(S) | : Robert L. Rae et al. | |

It is certified that error appears in the above-identified patent and that said Letters Patent is hereby corrected as shown below:

In claim 29, Column 15, Line 43, replace "tree-way" with --three-way--.

Signed and Sealed this
Twenty-sixth Day of July, 2011

David J. Kappos
*Director of the United States Patent and Trademark Office*